US008862563B2

(12) United States Patent
Sivashanmugam et al.

(10) Patent No.: US 8,862,563 B2
(45) Date of Patent: Oct. 14, 2014

(54) GETTING DEPENDENCY METADATA USING STATEMENT EXECUTION PLANS

(75) Inventors: Kaarthik Sivashanmugam, Bellevue, WA (US); David I. Noor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 12/778,128

(22) Filed: May 12, 2010

(65) Prior Publication Data

US 2011/0282851 A1 Nov. 17, 2011

(51) Int. Cl.
*G06F 7/00* (2006.01)
*G06F 17/30* (2006.01)

(52) U.S. Cl.
CPC ................ *G06F 17/30477* (2013.01)
USPC ........................................................ 707/705

(58) Field of Classification Search
None
See application file for complete search history.

(56) References Cited

U.S. PATENT DOCUMENTS

| 5,937,401 | A  | * | 8/1999  | Hillegas .................................. 1/1 |
|---|---|---|---|---|
| 7,720,836 | B2 | * | 5/2010  | Abajian et al. ................. 707/711 |
| 7,739,269 | B2 | * | 6/2010  | Chaudhuri et al. ............ 707/718 |
| 8,060,495 | B2 | * | 11/2011 | Beavin et al. .................. 707/718 |
| 2004/0039729 | A1 | * | 2/2004 | Boger et al. ....................... 707/2 |
| 2004/0153448 | A1 | * | 8/2004 | Cheng et al. ....................... 707/4 |
| 2005/0278355 | A1 |   | 12/2005 | Gonzalez |
| 2005/0289167 | A1 |   | 12/2005 | Haselden et al. |
| 2006/0161557 | A1 | * | 7/2006 | Dettinger et al. ............. 707/100 |
| 2006/0224563 | A1 | * | 10/2006 | Hanson et al. ..................... 707/2 |
| 2006/0271505 | A1 | * | 11/2006 | Vierich et al. ..................... 707/2 |
| 2007/0203893 | A1 |   | 8/2007 | Krinsky et al. |
| 2007/0226237 | A1 |   | 9/2007 | Gong et al. |
| 2008/0177694 | A1 | * | 7/2008 | Chaudhuri et al. ............... 707/2 |
| 2008/0288641 | A1 | * | 11/2008 | Messer et al. ................. 709/226 |
| 2008/0295065 | A1 |   | 11/2008 | Hawkins et al. |
| 2009/0024572 | A1 | * | 1/2009 | Mehta et al. ....................... 707/2 |
| 2009/0106210 | A1 | * | 4/2009 | Slezak et al. ....................... 707/3 |
| 2009/0106321 | A1 | * | 4/2009 | Das et al. ....................... 707/200 |
| 2010/0145917 | A1 | * | 6/2010 | Bone et al. ..................... 707/694 |
| 2011/0191324 | A1 | * | 8/2011 | Wang et al. .................... 707/718 |

OTHER PUBLICATIONS

Provisional U.S. Appl. No. 60/980,710, filed on Oct. 17, 2007.*
"Oracle Enterprise Manager Administrator's Guide Release 9.2.0", Retrieved at << http://web.deu.edu.tr/doc/oracle/B10501_01/em.920/a96670/ch_dba.htm >>, Retrieved Date: Mar. 18, 2010, pp. 19.
"Parsing", Retrieved at << http://www.orafaq.com/wiki/Parsing >>, "Last Modified" Date: Jan. 7, 2010, pp. 5.
"What's New in Oracle Warehouse Builder", Retrieved at << http://download.oracle.com/docs/cd/E11882_01/owb.112/e10581/whatsnew.htm >>, Retrieved Date: Mar. 18, 2010, pp. 16.
"Metadata Component Provider", Retrieved at << http://www.metaintegration.net/ >> on Mar. 17, 2010, pp. 1-4.

(Continued)

*Primary Examiner* — Jay Morrison
(74) *Attorney, Agent, or Firm* — Nicholas Chen; Kate Drakos; Micky Minhas (57) ABSTRACT

An execution plan for a database statement can be retrieved from a database server. References to objects can be identified in the execution plan, and metadata from the references can be assembled in a data structure on computer readable storage media. The metadata can reflect dependencies on the objects. Additionally, other dependency metadata can be augmented with the metadata from the references.

20 Claims, 5 Drawing Sheets

(56) References Cited

OTHER PUBLICATIONS

"Meta Integration Solutions Through Pictures", Retrieved at << http://www.metaintegration.net/Products/Overview/ >>, on Mar. 17, 2010, pp. 1-8.

Friedrich, John R., "Metadata Based Impact and Lineage Analysis Across Heterogeneous Metadata Sources", Retrieved at << http://www.metaintegration.net/Products/News/index.html >>, The 9th Annual Wilshire Meta-Data Conference and the 17th Annual DAMA International Symposium, May 25, 2005, pp. 1-55.

Friedrich, John R., "Meta-Data Version and Configuration Management in Multi-Vendor Environments", Retrieved at << http://delivery.acm.org/10.1145/1070000/1066251/p799-friedrich.pdf?key1=1066251&key2=0166160721&coll=GUIDE&dl=GUIDE&CFID=85078295&CFTOKEN=50317049 >>, Proceedings of the 2005 ACM SIGMOD international conference on Management of data 2005, Jun. 14-16, 2005, pp. 799-804.

Bremeau, Christian H., "Metadata Flow in a Multi-Vendor Enterprise Toolset", Retrieved at << http://www.metaintegration.net/Products/News/index.html >>, May 25, 2004, pp. 1-46.

Baragoin, et al., "DB2 Cube Views Getting Started with Meta Integration", Retrieved at << http://www.metaintegration.net/Publications/2003-IBM-DB2CubeViewsRedPaper-MetaIntegration.pdf >>, Sep. 2003, pp. 116.

* cited by examiner

GETTING DEPENDENCY METADATA USING STATEMENT EXECUTION PLANS

BACKGROUND

A database may store dependency information for its objects in its system catalogs and/or views, or using some other mechanism. Such dependency information may be used for impact analysis, data lineage, and/or some other functionality.

SUMMARY

The tools and techniques described herein relate to using database statement execution plans to obtain dependency metadata (i.e., metadata that represents dependencies between objects).

In one embodiment, the tools and techniques can include retrieving from a database server an execution plan for a database statement. As used herein, a database statement is a request to perform an operation on a database or a reference to such a request. For example, the request may be a request to modify at least a portion of a database, a request to perform a query on a database, etc. A database statement may be in a particular language, such as a structured query language (SQL) dialect. An execution plan is a data structure that lists sub-operations to be performed in accomplishing the overall operation requested by a database statement. References to objects can be identified in the execution plan, and metadata from the references (i.e., metadata extracted using the references) can be assembled in a data structure on computer readable storage media. The metadata can reflect dependencies on the objects.

In another embodiment, the tools and techniques can include identifying a database statement in a software artifact. A software artifact refers to a software component on one or more computer readable media, where the software component can use database statements. The software artifact may be in any of various forms, such as a program or portion of a program, instructions executed by a program, a SQL Server® Integration Services (SSIS) package, etc. An execution plan for the database statement can be retrieved, and references to objects can be identified in the execution plan. Metadata from the references can be assembled in a data structure, where the metadata can reflect dependencies of the software artifact on the objects.

In yet another embodiment, the tools and techniques can include retrieving an execution plan for a database statement and identifying references in the execution plan to objects. Metadata from the references can be assembled in a data structure. The metadata can reflect dependencies on the objects. Additionally, other dependency metadata can be augmented with the metadata from the references.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved retrieval and assembly of dependency metadata by using database statement execution plans. Such improvements may result from the use of various techniques and tools separately or in combination.

Such techniques and tools may include getting dependency information of a database statement by sending the statement to a database server and requesting execution plan(s) for the statement. The information in the execution plan(s) can be used to identify the statements' dependencies on the objects in the server. For example, a database statement may be identified in a software artifact, and an execution plan for the database statement may be retrieved from a database server. The retrieved execution plan can be parsed, and references in the execution plan to objects can be identified. Using those references, dependency metadata can be assembled. The dependency metadata can reflect dependencies of the software artifact on the objects referenced in the execution plan. The dependency metadata can also be processed by correlating it (i.e., by comparing different parts of the metadata, such as to identify duplicates), removing duplicates that may be found, assembling the metadata, and using the metadata to augment other dependency metadata (e.g., metadata extracted for other database statements using the same technique, and/or metadata extracted using other techniques that may not use execution plans).

Accordingly, one or more substantial benefits can be realized from the tools and techniques described herein. For example, the information available in an execution plan generated by a database server can be used to extract dependency metadata for a database statement corresponding to the plan. Thus, dependency data can be extracted for a software artifact that is configured to issue that statement. Accordingly, dependency metadata for a software artifact may be identified and assembled without a user even identifying object names to provide to a database server.

However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 1:
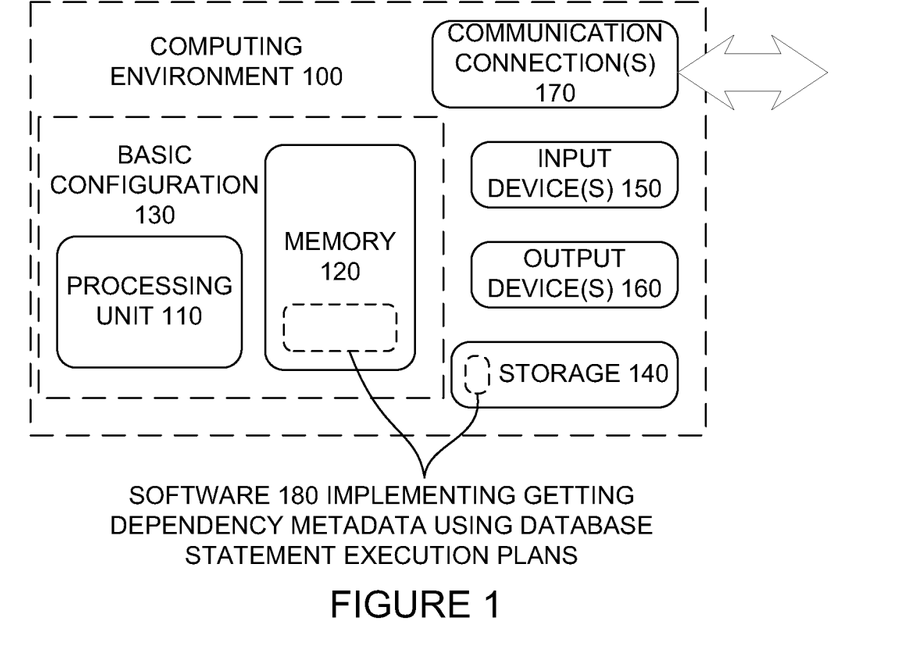
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a database server and/or an environment for getting dependency metadata using database statement execution plans. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) that can include one or more software applications implementing getting dependency metadata using database statement execution plans.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
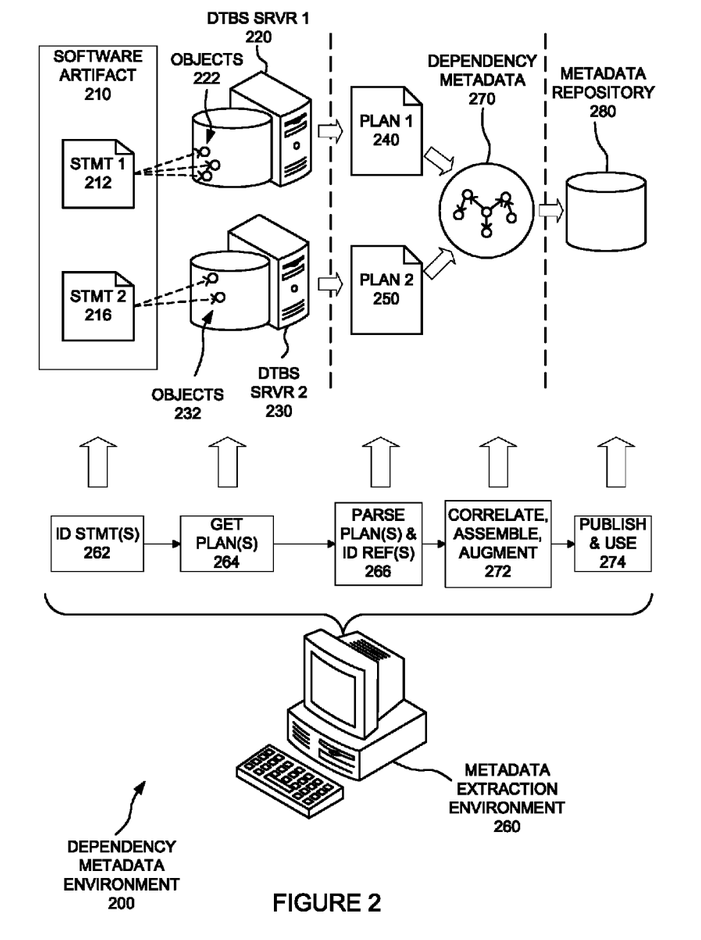
FIG. 2 is schematic diagram of a dependency metadata environment.

II. System and Environment for Getting Metadata Using Database Statement Execution Plans FIG. 2 is a block diagram of a dependency metadata environment (200) in conjunction with which one or more of the described embodiments may be implemented. The dependency metadata environment (200) can include a software artifact (210), which can include database statements, or in other words the software artifact (210) can include instructions to issue one or more database statements, such as by issuing the statements to one or more database servers. The illustrated software artifact (210) in FIG. 2 can include two database statements: statement 1 (212) and statement 2 (216). Database statement 1 (212) can be issued to database server 1 (220), and the processing of statement 1(212) by database server 1 (220) can depend on one or more objects (222), which may be accessed locally and/or remotely by database server 1 (220). Thus, the processing of statement 1 (212) and the processing of the software artifact (210) depends on the state and availability of the objects (222). Database statement 2 (216) can be issued to another database server, database server 2 (230), and the processing of statement 2 (216) by database server 2 (230) can depend on one or more objects (232), which can be accessed locally and/or remotely by database server 2 (230). For example, the database servers (220 and 230) can be servers for relational databases, and they can respond to SQL language database statements.

In processing database statement 1 (212), database server 1 (220) can follow an execution plan, execution plan 1 (240). Execution plan 1 (240) may be generated by database server 1 (220) upon receiving database statement 1 (212). Alternatively, plan 1 (240) may be a pre-existing plan. For example, database server 1 (220) may cache execution plans that are generated, so that the plans can be reused when the same database statement is received again at a later time. Similarly, database server 2 (230) can follow another execution plan, execution plan 2 (250), when processing database statement 2 (216).

Referring still to FIG. 2, the dependency metadata environment (200) can also include a metadata extraction environment (260). For example, the metadata extraction environment (260) can include one or more database servers and/or database clients, or it may be in a separate system, such as a separate system dedicated to dependency metadata extraction and/or to impact analysis and lineage assessments. The metadata extraction environment (260) can perform an identify statements operation (262) to identify the statements (212 and 216) from the software artifact (210). The identify statements operation (262) can be performed by parsing the software artifact (210) and extracting identified statements (212 and 216). Alternatively, the identify statements operation (262) may be performed in some other manner, such as by executing the software artifact (210) and analyzing statements (212 and 216) issued by the software artifact as the artifact executes.

The metadata extraction environment (260) can also perform a get plans operation (264), which can include retrieving from database servers (220 and 230) execution plans (240 and 250) for the identified statements (212 and 216). This may include retrieving more than one execution plan per database statement, such as where a database statement is processed in multiple batches, with one execution plan being generated for each batch.

The metadata extraction environment (260) can also perform a parsing and reference identification operation (266) on the retrieved execution plans (240 and 250) to identify object references in the plans (240 and 250). Such object references in an execution plan (240 or 250) can reveal the objects (222 or 232) that the processing of the corresponding statement (212 and 216) depends on. Thus, the references to objects in an execution plan (240 or 250) can show that the processing of the corresponding statement (212 or 216) depends on those objects, and thus that the software artifact (210) that would issue the corresponding statement (212 or 216) also depends on those objects. Performing the parsing and reference identification operation (266) may include invoking a parsing module for a particular language dialect (e.g., a particular SQL dialect) or a particular database server type. For example, one parser may be used for execution plans from Microsoft SQL Server® database servers, another parser may be used for execution plans from Oracle database servers, and other parsers may be used for other types of database servers. The corresponding parser can parse the execution plan, and translate the results into a form that is useable by other components of the metadata extraction environment (260).

Using those references identified in the plans (240 and 250), the metadata extraction environment (260) can perform a correlation, assembly, and augmentation operation (272) on the resulting dependency metadata (270). The correlation can include comparing and determining correlations between different entries in the dependency metadata (270), which may include determining whether any duplicate entries are present in the dependency metadata (270). This can be done using known sorting and/or matching techniques. Such duplicates can then be eliminated, such as by deleting one out of two duplicate references. Assembling can include assembling references identified in an execution plan (240 or 250) into dependency metadata (270) in a data structure, possibly after translating, storing, or otherwise processing the references and/or data structure. Similarly, augmenting can include using the dependency metadata (270) to augment other dependency metadata (possibly after correlating the dependency metadata extracted using the execution plan (240 or 250) with the other dependency metadata). For example, the other dependency metadata may include metadata that was extracted from other execution plan(s) (e.g., augmenting dependency metadata extracted using plan 1 (240) and metadata extracted using plan 2 (250)) and/or dependency metadata obtained by some other technique, such as a technique that does not involve extracting the metadata using execution plans. For example, the other metadata may have been obtained by sending requests for dependency metadata for particular objects to one or more database servers.

The metadata extraction environment (260) can also perform a metadata publication and use operation (274), which can include publishing the dependency metadata (270) in a metadata repository (280) and using the dependency metadata (270), such as in impact analysis and lineage operations. For example, this can include using the dependencies metadata in the metadata repository (280) for impact analysis and for determining data lineage of the software artifact (210), the statements (212 and 216), and/or the objects (222 and 232). Such impact analysis and lineage operations may be performed using existing operations, such as existing data lineage queries and existing impact analysis techniques.

While the operations (262, 264, 266, 272, and 274) have been described as being performed in one metadata extraction environment (260), the operations could be performed in different environments. For example, use of the published metadata may be performed in a different environment. As another example, the identify statements operation (262) may be performed in a different environment from the get plans operation (264) and the parsing and reference identification operation (266).

An example will now be discussed for extracting metadata using an execution plan for a specific database statement from a software artifact. A software artifact may include the following SQL database statement: "SELECT*FROM ABC". This statement requests the selection of all columns (as indicated by the use of "*") from an object named ABC. For example, ABC may be the name of a database table in a database named DB, and the ABC database table may have six columns named COL1, COL2, COL3, COL4, COL5, and COL6. An extraction environment can parse the software artifact and identify the "SELECT*FROM ABC" database statement within the artifact. The extraction environment can also request an execution plan for this database statement. This request can be made to the same database server to which the database statement will be sent when the software artifact executes. Execution plans may be retrieved in various different formats, depending on the type of database server that will be providing the plan. For example, plans may be estimated execution plans that can be generated without actually processing the database statement, or actual execution plans that are generated when database statements are actually processed. It may be desirable for the retrieved execution plan to be an estimated plan, so that resources are not used in actually processing the database statement. Additionally, execution plans may be provided in different formats, such as XML formats or plain text formats. As one example, in a SQL Server® environment, the following commands can be used to retrieve an XML version of an estimated execution plan for the "SELECT*FROM ABC" database statement:

```
GO
SET SHOWPLAN_XML ON;
GO
SELECT *
FROM ABC;
GO
SET SHOWPLAN_XML OFF;
GO
```

The returned execution plan can be loaded and parsed. In this case, the parsing will reveal in the execution plan references to the database DB, the database table ABC, and the columns COL1, COL2, COL3, COL4, COL5, and COL6. This in turn reveals that the software artifact that includes the "SELECT*FROM ABC" statements depends on these objects. Accordingly, the references to these objects can be assembled into dependency metadata and correlated, and the dependency metadata may be used to augment other metadata of the software artifact. The dependency metadata can be published in a metadata repository so that it can be used, such as in performing impact analysis and lineage operations.

III. Techniques for Getting Dependency Metadata Using Database Statement Execution Plans Several techniques for getting dependency metadata using database statement execution plans will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
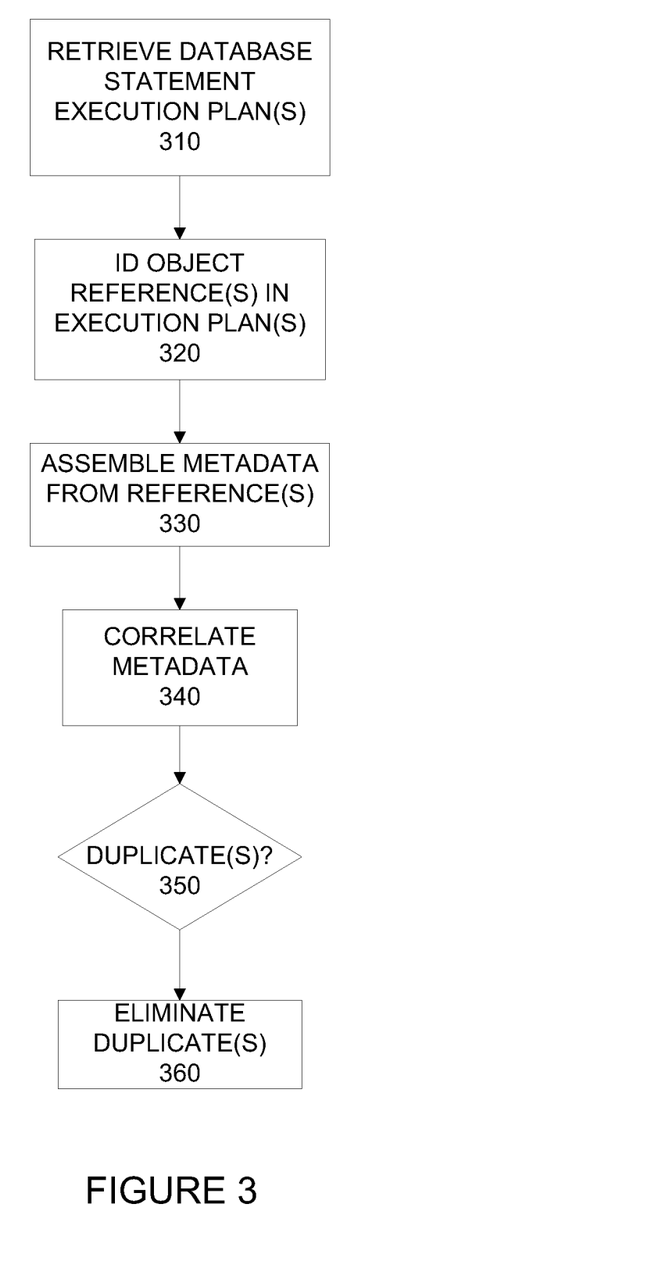
FIG. 3 is a flowchart of a technique for getting dependency metadata using database statement execution plans.

Referring to FIG. 3, a technique for getting dependency metadata using database statement execution plans will be discussed. The technique can include retrieving (310) from a database server at least one execution plan for a database statement. For example, the database statement may be a SQL statement. Also, the database statement may be a statement identified in a software artifact. One or more references to one or more objects can be identified (320) in the execution plan(s). Metadata from the reference(s) can be assembled (330) in a data structure on one or more computer readable storage media. Also, the metadata can reflect one or more dependencies on the object(s), such as dependencies of the software artifact on the object(s).

Additionally, other dependency metadata can be augmented with the metadata from the reference(s). The other dependency metadata can include metadata identified in one or more other execution plans for one or more other database statements. Also, the other metadata may include metadata extracted without identifying references in a database statement execution plan.

The metadata from the reference(s) may include multiple entries, and the technique can include correlating (340) the metadata. Additionally, correlating (340) can include determining (350) whether the metadata includes one or more duplicate entries. If so, then the technique can include eliminating (360) the one or more duplicate entries. The at least one execution plan can include multiple execution plans. For example, there may be more than one execution plan per database statement, as discussed above (e.g., one execution plan per batch). Additionally, there may be multiple database statements in the software artifact, with one or more execution plans per database statement. Additionally, the one or more references can include at least one reference in each of two or more of the multiple execution plans.

Figure 4:
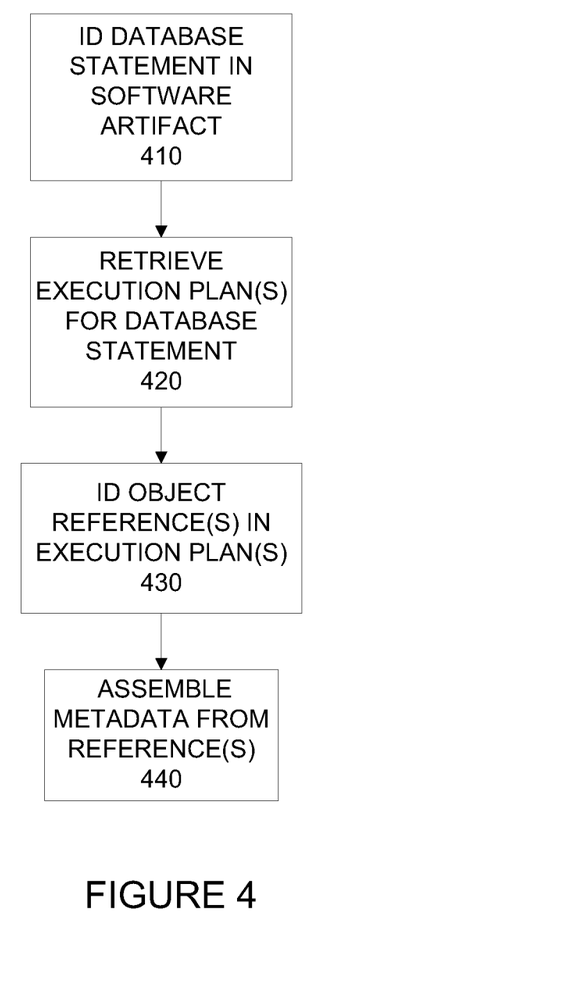
FIG. 4 is a flowchart of another technique for getting dependency metadata using database statement execution plans.

Referring now to FIG. 4, another technique for getting dependency metadata using database statement execution plans will be discussed. In the technique, a database statement, such as a SQL statement, can be identified (410) in a software artifact. At least one execution plan for the database statement can be retrieved (420), and one or more references to one or more objects can be identified (430) in the execution plan(s). Metadata from the reference(s) can be assembled (440) in a data structure. The metadata can reflect one or more dependencies of the software artifact on the object(s).

The reference(s) can include multiple references, and the technique can include correlating the metadata. The correlation can include determining whether the metadata includes one or more duplicate entries. If so, then the technique can further include eliminating the duplicate entry or entries. The technique can also include augmenting other dependency metadata with the metadata from the reference(s). For example, the other dependency metadata may include metadata identified in one or more other execution plans for one or more other database statements and/or dependency metadata extracted without identifying statements in a database statement execution plan.

Figure 5:
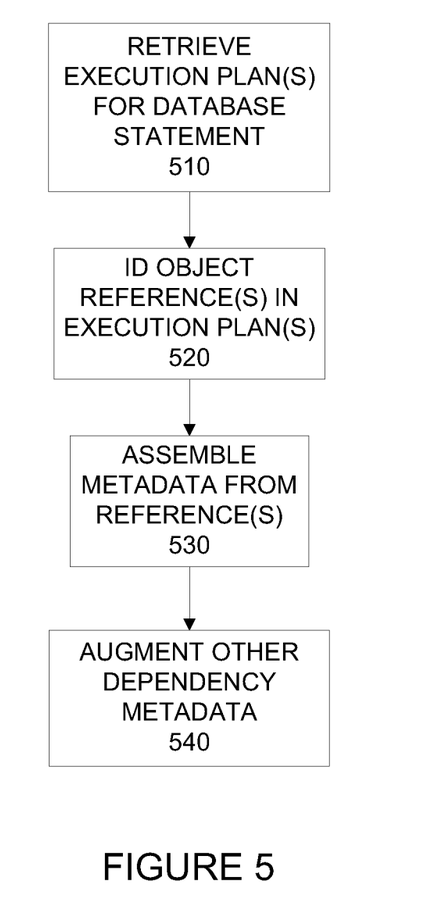
FIG. 5 is a flowchart of yet another technique for getting dependency metadata using database statement execution plans.

Referring now to FIG. 5, yet another technique for getting dependency metadata using database statement execution plans will be discussed. The technique can include retrieving (510) at least one execution plan for a database statement, such as a SQL statement. The database statement may be a statement identified in a software artifact. One or more references to one or more objects can be identified (520) in the execution plan(s). Moreover, metadata from the reference(s) can be assembled (530) in a data structure. The metadata can reflect one or more dependencies on the object(s). The one or more dependencies can be one or more dependencies of the software artifact on the object(s). The technique can also include augmenting (540) other dependency metadata with the metadata from the reference(s). The other dependency metadata can include metadata extracted without identifying statements in an execution plan and/or metadata identified in one or more other execution plans for one or more other database statements. The technique may also include correlating the metadata and eliminating one or more duplicate entries identified while correlating the metadata.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   retrieving from a database server at least one execution plan for a database statement, the at least one execution plan being retrieved by a computing environment outside the database server;
   identifying in the at least one execution plan one or more references to one or more objects, identifying the one or more references to the one or more objects being performed outside the database server;
   assembling metadata from the one or more references in a data structure on one or more computer readable storage media, the metadata reflecting one or more dependencies on the one or more objects; and
   augmenting other dependency metadata with the metadata from the one or more references, wherein the other dependency metadata comprises metadata identified in one or more other execution plans for one or more other database statements, and wherein the one or more other execution plans are different from the at least one execution plan and the other database statements are different from the database statement.

2. The method of claim 1, further comprising augmenting other dependency metadata with the metadata from the one or more references, the other dependency metadata being metadata extracted without identifying references in a database statement execution plan.

3. The method of claim 1, further comprising identifying the database statement in a software artifact that is configured to issue the database statement, wherein the dependencies are dependencies of the software artifact on the one or more objects.

4. The method of claim 3, further comprising using the metadata in the data structure in determining data lineage of the software artifact.

5. The method of claim 1, further comprising correlating the metadata.

6. The method of claim 5, wherein correlating comprises determining that the metadata includes one or more duplicate metadata entries, and wherein the method further comprises eliminating the one or more duplicate entries.

7. The method of claim 1, wherein:
   the database statement is a SQL statement;
   the dependencies are dependencies of a software artifact on the one or more objects;
   the metadata comprises multiple entries; and
   the method further comprises:
      identifying the database statement in the software artifact, the software artifact being configured to issue the database statement;
      correlating the metadata;
      eliminating one or more duplicate entries in the metadata found while correlating the metadata; and
      augmenting other dependency metadata with the metadata from the one or more references, the other dependency metadata being metadata extracted without identifying references in a database statement execution plan.

8. The method of claim 1, wherein the at least on execution plan lists sub-operations to be performed, the sub-operations including one or more operations on a database, and wherein the identifying in the at least one execution plan the one or more references comprises identifying in the at least one execution plan the one or more references to one or more objects in the database upon which the sub-operations are to be performed.

9. The method of claim 8, wherein the one or more objects comprise an object selected from a group consisting of the database, a table in the database, and a column in the database.

10. A computer system comprising:
    at least one processor; and
    a memory comprising instructions stored thereon that when executed by the at least one processor cause the at least one processor to perform acts comprising:
       identifying a first database statement in a software artifact that is configured to issue the first database statement;
       retrieving at least one execution plan for the first database statement;
       identifying in the at least one execution plan one or more references to one or more objects;
       assembling in a data structure metadata from the one or more references, the metadata reflecting one or more dependencies of the software artifact on the one or more objects; and
       augmenting other dependency metadata with the metadata from the one or more references, the other dependency metadata comprising metadata identified in one or more other execution plans that are different from the at least one execution plan, the one or more other execution plans being for one or more other database statements that are different from the first database statement.

11. The computer system of claim 10, wherein the metadata from the one or more references comprises multiple entries and the acts further comprise correlating the other metadata and the metadata from the one or more references.

12. The computer system of claim 11, wherein correlating comprises identifying one or more duplicate entries in the other metadata and the metadata from the one or more references, and eliminating the one or more duplicate entries.

13. The computer system of claim 10, wherein the first database statement is a SQL statement.

14. The computer system of claim 10, wherein the other dependency metadata further comprises metadata extracted without identifying references in a database statement execution plan.

15. The computer system of claim 10, wherein the one or more objects comprise one or more objects in a database upon which sub-operations listed in the at least one execution plan are to be performed.

16. One or more computer-readable storage media having computer-executable instructions embodied thereon that, when executed by at least one processor, cause the at least one processor to perform acts comprising:
    identifying a database statement in a software artifact that is configured to issue the database statement;
    retrieving at least one execution plan for the database statement;
    identifying in the at least one execution plan one or more references to one or more objects;

assembling metadata from the one or more references in a data structure, the metadata reflecting one or more dependencies of the software artifact on the one or more objects; and augmenting other dependency metadata with the metadata from the one or more references, wherein the other dependency metadata comprises metadata identified in one or more other execution plans for one or more other database statements, and wherein the one or more other execution plans are different from the at least one execution plan and the other database statements are different from the database statement.

17. The one or more computer-readable storage media of claim 16, wherein the database statement is a SQL statement.

18. The one or more computer-readable storage media of claim 16, wherein the other dependency metadata further comprises metadata extracted without identifying references in an execution plan.

19. The one or more computer-readable storage media of claim 16, wherein the one or more objects comprise one or more objects in a database upon which sub-operations listed in the at least one execution plan are to be performed.

20. The one or more computer-readable storage media of claim 16, wherein the acts further comprise correlating the metadata from the one or more references and eliminating one or more duplicate entries identified while correlating the metadata.

\* \* \* \* \*